(12) United States Patent
Thomas et al.

(10) Patent No.: US 6,386,057 B1
(45) Date of Patent: May 14, 2002

(54) DRIVE DEVICE FOR SEVERAL UNITS OF A MACHINE

(75) Inventors: Volker Thomas; Christian Harzbecker, both of Chemnitz (DE)

(73) Assignee: Fraunhofer-Gesellschaft zur Foerderung der Angewandten Forschung E.V. (DE)

( * ) Notice: Subject to any disclaimer, the term of this patent is extended or adjusted under 35 U.S.C. 154(b) by 0 days.

(21) Appl. No.: 09/508,236

(22) PCT Filed: Sep. 11, 1998

(86) PCT No.: PCT/EP98/05791

§ 371 Date: May 8, 2000

§ 102(e) Date: May 8, 2000

(87) PCT Pub. No.: WO99/14014

PCT Pub. Date: Mar. 25, 1999

(30) Foreign Application Priority Data

Sep. 12, 1997 (DE) .......................................... 197 40 208

(51) Int. Cl.[7] .................................................. A47C 1/02
(52) U.S. Cl. ...................................................... 74/89.28
(58) Field of Search ........................... 74/89.15, 424.72; 188/67, 70 R

(56) References Cited

U.S. PATENT DOCUMENTS 4,977,788 A 12/1990 Besemann
5,720,202 A * 2/1998 Senjo et al. ................ 74/89.15
5,747,896 A * 5/1998 Nagai et al. ............ 74/89.15 X
5,876,096 A * 3/1999 Yamakami ............. 74/89.15 X
6,026,696 A * 2/2000 Hehl ......................... 74/89.15

FOREIGN PATENT DOCUMENTS

DE 41 13 629 A1 10/1992
DE 44 32 308 A1 3/1996
JP 1193138 8/1989

OTHER PUBLICATIONS

Patent Abstracts of Japan; vol. 13, No. 485 (M–887), Nov. 6, 1989 and JP 01 193138 A (Nissan Motor Co Ltd), Aug. 3, 1989.

* cited by examiner

Primary Examiner—David A. Bucci
Assistant Examiner—Colby Hansen
(74) Attorney, Agent, or Firm—Marshall & Melhorn, LLC

(57) ABSTRACT

The inventive drive device for several units of a machine has an inertia drive with an inertia drive spindle (1) driven by a motor, and several inertia drive nuts (2), the nuts being fitted on the inertia drive spindle (1) and being allocated to the units. The inertia drive nuts (2) are each arranged in the housings of the units in such a way that they can turn but cannot be displaced axially. During the rest phase of a particular unit, the inertia drive nut (2) is solidly connected to the inertia drive spindle (1) with a first positive and/or nonpositive fit. For the movement phase of the aggregate, the nut (2) is disconnected from the spindle (1) and is solidly connected to the housing with a second positive and/or nonpositive fit.

11 Claims, 2 Drawing Sheets

DRIVE DEVICE FOR SEVERAL UNITS OF A MACHINE

BACKGROUND OF THE INVENTION

1. Field of the Invention

The invention concerns a drive device for several units of a machine.

2. Description of the Related Art

From DE 44 32 308 C2 is known a drive device for auxiliary units such as tailstock or back rest of a CNC lathe, in which, in addition to the main feed shaft of controlled position for longitudinal and cross slides, an additional feed shaft of controlled position designed as a screw spindle is arranged parallel to the main feed shaft. The feed shaft designed as a screw spindle is driven by a further drive motor, and a nut with anti-twist means and a coupling device for entraining the auxiliary units is arranged on the screw spindle. The nut with coupling device is in each case moved under the auxiliary unit to be displaced, and a driver bolt present in the auxiliary unit is extended and latched in the coupling device. Conversely, entrainment of the auxiliary unit is interrupted by pulling the driver bolt.

This known drive device has the drawback that it is always only one unit that can be positioned or entrained, while the others remain stationary during this time.

From U.S. Pat. No. 4,977,788 is provided a drive device for several units of a machine, which comprises a sliding inertia drive. The latter is provided on the spindle circumference with longitudinal grooves in which locking pawls can be latched for positioning the units stepwise.

OBJECT OF THE INVENTION

It is therefore the object of the invention to provide a drive device for several units of a machine, with which the units can be positioned simultaneously or independently of each other individually or in groups.

This object is achieved according to the invention by the characteristics of the main claim.

SUMMARY OF THE INVENTION

Due to the fact that several inertia drive nuts allocated to the units are provided on the inertia drive spindle and the inertia drive nut of each unit to be positioned is mounted rotatably but axially non-displaceably in a housing rigidly connected to the unit, wherein, by a brake which produces a force-locking connection, for the unit to be actuated at any given time an operative connection to the spindle is made, whereas for the unit which is to remain at rest during this time the operative connection is released and a force-locking connection of the nut to the spindle is made instead, which achieves rotation of the nut with the spindle and so prevents uncontrolled twisting of the nut, the units mounted on one spindle can be positioned independently and/or simultaneously.

Due to the measures provided in the subsidiary claims, advantageous developments and improvements are possible.

BRIEF DESCRIPTION OF THE DRAWINGS

A practical example of the invention is shown in the drawing and described in more detail in the description below, for example for a lathe with tailstock, back rest slide and the like.

FIG. 3 schematically illustrates an embodiment of the present invention.

DESCRIPTION OF THE PREFERRED EMBODIMENTS

Figures 1, 2:
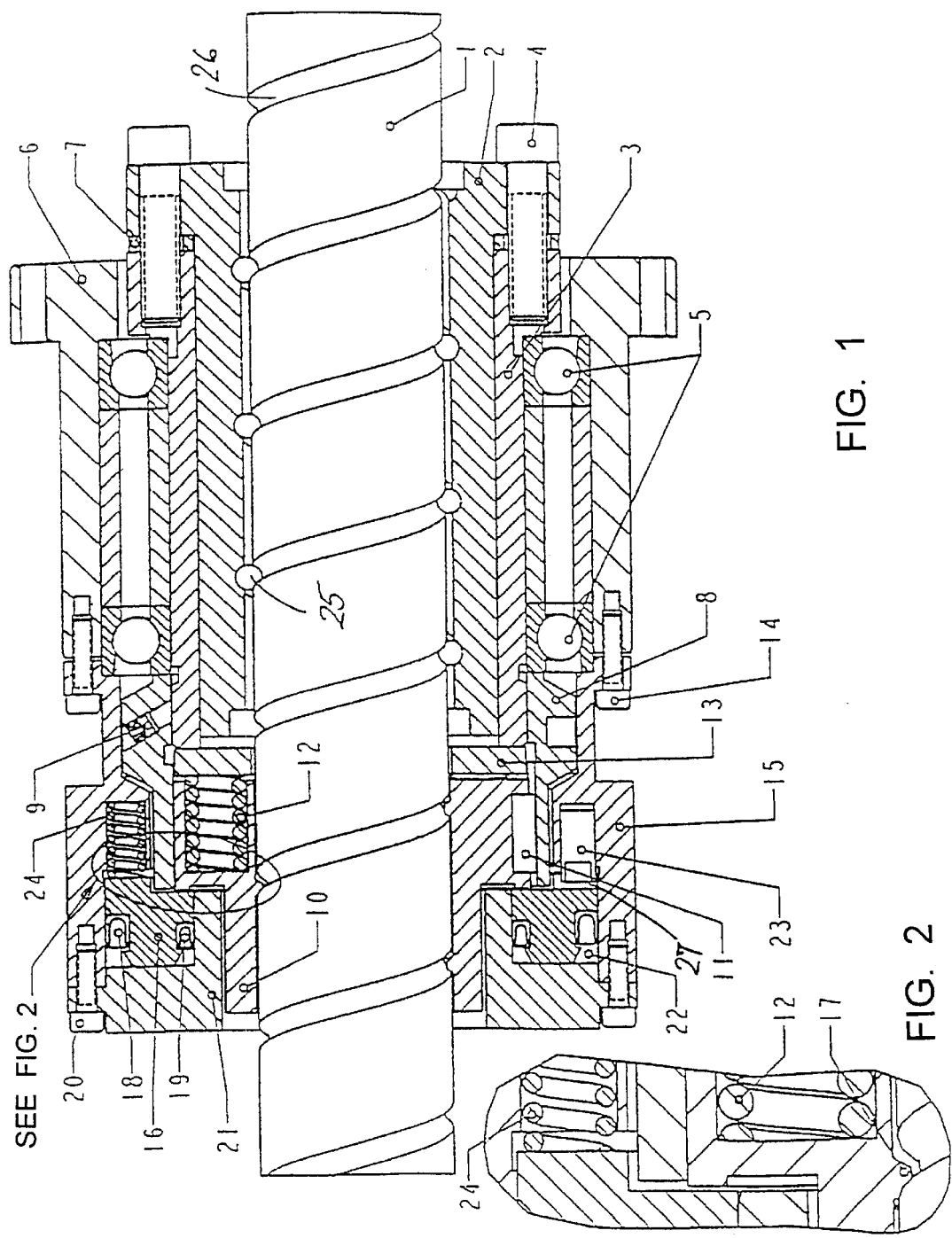
FIG. 1 shows a section through part of the spindle with a driven component mounted on the spindle. The drive device shown partially in FIG. 1 comprises a rolling inertia drive spindle I on which are mounted a plurality of driven components connected to the respective units. One of the driven components is shown in detail in the figure. The inertia drive spindle 1 is rotated by a motor 100.
FIG. 2 is an enlarged view of the detail portion of FIG. 1.
Figure 3:
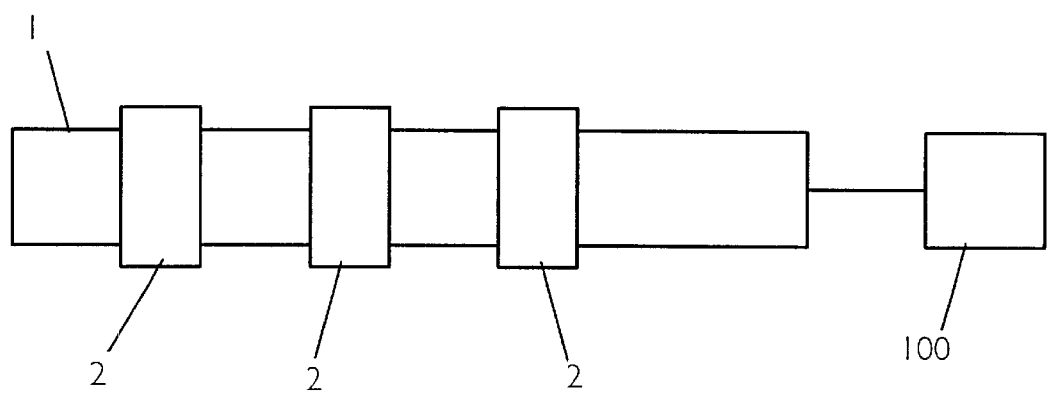
FIG. 3 schematically shows the inertia drive spindle 1 with multiple inertia drive nuts 2 attached, in addition to the motor 100.

Each driven component comprises a rolling inertia drive nut which can be displaced axially by means of balls 25 in thread turns 26. The inertia drive nut 2 is held in a sleeve 3 and rigidly connected to it by screws 4. On the screws 4 between sleeve 3 and inertia drive nut 2 are arranged in each case shims 7 which are necessary to bring the screw holes of the inertia drive nut 2 and the sleeve 3 into register. The sleeve 3 is mounted by rolling bearings 5 in the housing 6 of the associated unit. Onto one end of the sleeve 3 is screwed an adjusting nut 8 which is locked by at least one locking screw and which fixes the rolling bearings 5. The portion of the adjusting nut 8 protruding beyond the sleeve 3 is cylindrical, and in this cylinder engages part of a sleeve-like brake 10 which is axially displaceable by a small amount, but mounted non-rotatably by a feather key 11. In the end face of the sleeve-like brake 10 facing towards the inertia drive nut 2 is provided at least one hole which serves as a hole for receiving a spring 12. Preferably over the circumference of the brake 10 are arranged several receiving holes and several springs 12. The springs are supported on a washer 13 which is located between the end face of the brake 10 and the sleeve 3. The sleeve-like brake 10 is provided on its inner circumference with a spindle-like thread web 17 which engages in the thread turns 26 of the inertia drive spindle 1.

Attached to the housing 6 of the associated unit by screws 14 is a cylinder 15 which also locks the rolling bearings 5 and in whose cavity is arranged a ring piston 16 which is sealed off by seal 18, 19. A cylinder bottom 21 attached to the cylinder 15 with screws 20 defines, together with the cylinder 15 and the ring piston 16, a chamber 22 for a pressure medium, preferably for hydraulic oil. In the end face of the ring piston 16 opposite the cylinder bottom 21 is provided at least one recess 27 in which can engage a guide bolt 23 connected to the cylinder 15. In the cylinder 15 are preferably provided several receiving holes in which are inserted, under initial tension, springs 24 which are supported on the cylinder 15 and on the ring piston 16.

In the brakes for the unit, the brake which is operated mechanically by means of the springs 12 ensures that the rolling inertia drive nut 2 is rigidly connected to the rolling inertia drive spindle 1 by friction locking. For this purpose the springs 12 press on the one hand against the washer 13, so that there is force locking between sleeve 3, washer 13 and springs 12, and on the other hand against the sleeve-like brake 10 in such a way that, as shown in FIG. 2, the thread web 17 abuts in force-locking relationship against the thread flank of the thread turns 26 of the inertia drive spindle 1 facing away from the inertia drive nut 2. Due to this (first) friction locking between the aforementioned parts, the rolling inertia drive nut 2 is connected to the rolling inertia drive spindle 1, and when the inertia drive spindle is rotating the inertia drive nut 2 therefore also rotates without slipping, with the result that the associated unit (housing 6) is not displaced and remains stationary.

When the respective unit is to be positioned, the pressure medium, preferably hydraulic oil, is conducted into the oil chamber 22 via connections, not shown, with the result that the ring piston 16 moves to the right, after a short distance reaches the brake 10 and entrains the latter further to the right against the pressure of the springs 12 until it abuts against the adjusting nut. A (second) friction locking arises between ring piston 16 and adjusting nut 8, preventing mutual rotation. As the ring piston 16 is prevented from rotating relative to the cylinder 15 by means of the driver or guide bolt 23, there is a rigid connection between the rolling inertia drive nut 2 and the housing 6. At the same time there is no longer contact between the thread web 17 of the brake 10 and the thread flanks of the thread turns 26 of the rolling inertia drive spindle 1.

If the hydraulic pressure in the oil chamber 22 is turned off again, the springs 12 push the brake 10 to the left until the thread web 17 again abuts against the left thread flank of the thread turns 26 of the inertia drive spindle 1. The springs 24 push the ring piston 16 still further to the left, so that ring piston 16 and adjusting nut no longer touch each other.

In the practical example above, friction locking for making connections between inertia drive nut and inertia drive spindle or housing is described. Naturally other force-locking and form-locking connections which can be produced by couplings, brakes or the like can be used.

What is claimed is:

1. A drive device for several units of a machine, each unit having a rest stage and a moving stage, the drive device comprising an inertia drive comprising a rolling inertia drive spindle driven by a motor and several inertia drive nuts which are mounted on the inertia drive spindle, each nut corresponds to one of the respective units and is mounted rotatably but axially non-displaceably in a housing of its respective unit, each unit comprises a first connection to the inertia drive spindle and a second connection to the inertia drive spindle, wherein in the rest stage of each respective unit, its allocated inertia drive nut is rotatable relative to the unit by the first connection to the inertia drive spindle and for the movement stage of the respective unit the first connection is released and the inertia drive nut can be operatively connected to the housing of the respective unit by the second connection, wherein the first connection is a force-locking connection which is configured as a brake, the force-locking connection comprising an axially displaceable sleeve arranged around the inertia drive spindle and the sleeve comprising at its circumference thread webs which engage in thread turns of the spindle and by which force locking can be produced.

2. Drive device according to claim 1, wherein the second connection is a force-locking connection.

3. Drive device according to claim 2 further comprising a brake release device, wherein the brake release device simultaneously makes the second force-locking connection.

4. Drive device according to claim 1, wherein the brake is under initial tension.

5. Drive device according to claim 1, further comprising a brake release device, wherein the brake under initial tension can be released by the brake release device acting against the initial tension.

6. Drive device according to claim 1, wherein, between housing and inertia drive nut are arranged rolling bearings.

7. Drive device according to claim 1 further comprising at least one spring, wherein the at least one spring is configured to provide initial tension for the brake in the rest stage, to ensure a first friction locking between brake and inertia drive spindle and brake and inertia drive nut.

8. Drive device according to claim 1 further comprising a brake release device, wherein the brake release device comprises an axially displaceable ring piston which can be subjected to a pressure medium.

9. Drive device according to claim 8, wherein the second connection is at least one of a form-locking connection and a force-locking connection, and between piston and inertia drive nut or intermediate elements rigidly connected to the latter, when the piston is subjected to pressure the second connection is ensured, and the housing of the unit when the inertia drive spindle is driven is displaced axially together with the inertia drive nut, the brake and the piston.

10. Drive device according to claim 8, wherein the housing or intermediate elements connected thereto are connected to at least one driver or guide bolt which engages in at least one corresponding recess provided in the ring piston.

11. Drive device according to claim 8, wherein, between ring piston and housing or intermediate elements rigidly connected thereto is inserted under initial tension at least one spring.

* * * * *